US006766986B2

(12) United States Patent
Konya (10) Patent No.: US 6,766,986 B2
(45) Date of Patent: Jul. 27, 2004

(54) METHOD AND APPARATUS FOR CONTROLLING PASSENGER FLOW ON AIRCRAFT

(75) Inventor: Kazuhide Konya, Mercer Island, WA (US)

(73) Assignee: The Boeing Company, Seattle, WA (US)

( * ) Notice: Subject to any disclaimer, the term of this patent is extended or adjusted under 35 U.S.C. 154(b) by 3 days.

(21) Appl. No.: 10/119,442

(22) Filed: Apr. 9, 2002

(65) Prior Publication Data

US 2003/0189135 A1 Oct. 9, 2003

(51) Int. Cl.[7] ............................................... B64D 1/08
(52) U.S. Cl. ............................. 244/137.2; 244/118.5
(58) Field of Search .................... 244/118.1, 118.5, 244/137.1, 137.2; 105/341, 341.5, 344, 343; 160/243, 242, 310, 368, 264, 265, 117, 84.4, 84.01, 48.08, 210; 14/69.5–72.5; 256/59, 67, 65.01; 182/113

(56) References Cited

U.S. PATENT DOCUMENTS

| | | | | |
|---|---|---|---|---|
| 922,430 | A | * | 5/1909 | Howson ...................... 105/341 |
| 1,178,239 | A | * | 4/1916 | Kling ......................... 105/341 |
| 1,224,681 | A | * | 5/1917 | Steele ........................ 105/341 |
| 2,547,811 | A |   | 4/1951 | Burnelli |
| 3,419,164 | A |   | 12/1968 | O'Neill |
| 3,515,074 | A |   | 6/1970 | Helbig |
| 3,583,465 | A | * | 6/1971 | Youngs et al. .............. 160/243 |
| 3,666,045 | A |   | 5/1972 | Olsen |
| 4,246,980 | A |   | 1/1981 | Miller |
| 4,712,339 | A |   | 12/1987 | Wenham et al. |
| 5,176,082 | A | * | 1/1993 | Chun et al. ................. 105/341 |
| 5,615,848 | A | * | 4/1997 | Ceriani ..................... 244/118.5 |
| 6,012,679 | A | * | 1/2000 | Auestad .................... 244/118.6 |
| 6,045,157 | A |   | 4/2000 | Peulin |
| 6,227,523 | B1 |   | 5/2001 | Haberlen |
| 6,257,523 | B1 | * | 7/2001 | Olliges ..................... 244/118.5 |
| 2002/0063187 | A1 |   | 5/2002 | Depeige et al. |

FOREIGN PATENT DOCUMENTS

| | | |
|---|---|---|
| EP | 0372386 | 11/1989 |
| GB | 2091183 | 7/1982 |

OTHER PUBLICATIONS

MD–12 Program Review, McDonnell Douglas and the MD–12 Team, Apr. 30, 1992 (p. 12).

FMC Airport Systems, JETWAY, The Bridge That Spans the Globe Brochure (54 pages), Copyright 2001 FMC Technologies, Inc.

* cited by examiner

Primary Examiner—Galen L. Barefoot
(74) Attorney, Agent, or Firm—Perkins Coie LLP (57) ABSTRACT

A method and apparatus for controlling passenger flow on an aircraft. The aircraft can include a fuselage having a passenger doorway, a door moveable relative to the doorway between an open position and a closed position, and an entry region positioned within the fuselage adjacent to the passageway doorway. The entry region can have a width configured to accommodate at least two people walking abreast. A plurality of seats are positioned within the fuselage and arranged along a first aisle having a first aisle axis and a second aisle having a second aisle axis, with the second aisle axis spaced apart transversely from the first aisle axis and with each aisle being accessible from the entry region. A restriction can be positioned in the entry region at least proximate to the passenger doorway, with the restriction dividing the entry region into a first portion accessible to the first aisle and a second portion accessible to the second aisle.

69 Claims, 8 Drawing Sheets

METHOD AND APPARATUS FOR CONTROLLING PASSENGER FLOW ON AIRCRAFT

CROSS-REFERENCE TO RELATED APPLICATION

The present application is related to pending U.S. patent application Ser. No. 10/119,442 titled METHOD AND APPARATUS FOR CONTROLLING PASSENGER FLOW INTO AND OUT OF AIRCRAFT, filed concurrently herewith.

TECHNICAL FIELD

The present invention relates generally to methods and apparatuses for controlling the flow of passengers on aircraft.

BACKGROUND

Existing commercial passenger aircraft are typically loaded and unloaded via a single doorway positioned toward the front of the aircraft. In one existing arrangement, a jetway extends from the doorway to an adjacent terminal structure to allow passengers to embark and disembark without being exposed to the weather. Alternatively, an open stairway can be positioned adjacent to the doorway, for example, when loading and unloading in predictably temperate conditions.

One drawback with both of the foregoing approaches is that loading and unloading the aircraft can take a substantial amount of time. The time spent loading and unloading passengers can significantly add to the passengers' overall trip time, and can reduce the airline's ability to fully utilize the aircraft. One approach to addressing this drawback is to position an additional jetway (or stairway) adjacent to a rear door of the aircraft to expedite loading and unloading. However, this approach can also have drawbacks. For example, this approach increases the number of jetways that airports must provide, and can increase the cost and complexity of the ground-based passenger handling systems.

SUMMARY

The present invention is directed generally toward methods and apparatuses for controlling passenger flow into and out of aircraft. An apparatus in accordance with an aspect of the invention includes a fuselage having a passenger doorway, a passenger door positioned in the passenger doorway, and an entry region positioned within the fuselage adjacent to the passenger doorway. The entry region has a width configured to accommodate at least two people walking abreast. A plurality of seats are positioned within the fuselage and arranged along a first aisle having a first aisle axis and a second aisle having a second aisle axis, the second aisle axis being spaced apart transversely from the first aisle axis, and each aisle being accessible from the entry region. A restriction is positioned in the entry region at least proximate to the passenger doorway, with the restriction dividing the entry region into a first portion accessible to the first aisle and the second portion accessible to the second aisle. The restriction at least restricts the movement of people between the first portion of the entry region and the second portion of the entry region.

In a further aspect of the invention, the restriction can be movable between a deployed position and a stowed position, with the restriction at least restricting access between the first and second portions of the entry region when in the deployed position, and with the restriction allowing access between the first and second portions of the entry region when in the stowed position. The restriction can include structures such as first and second upright members with a handrail extending between the upright members, a generally planar, flexible sheet, an extension that can extend through the doorway, and/or a reel with a flexible, coilable, elongated member extendably coiled on the reel.

In another aspect of the invention, the aircraft can include a fuselage having a passenger doorway, with the passenger doorway having a width configured to accommodate at least two people walking abreast. An entry region can be positioned within the fuselage adjacent to the passenger doorway and can have a width configured to accommodate at least two people walking abreast. A passenger door is positioned in the passenger doorway and is moveable between an open position and a sealably closed position. In yet another aspect of the invention, the aircraft can further include a restriction positioned in the entry region at least proximate to the passenger doorway, with the restriction dividing the entry region into a first portion and a second portion, and with the restriction at least restricting the movement of people from the first portion to the second portion.

Another aspect of the invention is directed toward a method for loading and/or unloading people from an aircraft. The method can include providing an aircraft having a fuselage with a passenger doorway, a passenger door positioned proximate to the passenger doorway, and an entry region positioned within the fuselage adjacent to the passenger doorway. A plurality of seats are positioned within the fuselage and arranged along a first aisle having a first aisle axis and a second aisle having a second aisle axis, with the second aisle axis being spaced apart transversely from the first aisle axis, and with each aisle being accessible from the entry region. The method can further include directing a first group of people to pass through the doorway and a first portion of the entry region accessible to the first aisle, and simultaneously directing a second group of people to pass through the doorway and a second portion of the entry region accessible to the second aisle, while at least restricting access between the first and second portions with a restriction positioned in the entry region.

DETAILED DESCRIPTION

The present disclosure describes passenger aircraft and methods and apparatuses for loading and unloading passengers from such aircraft. Many specific details of certain embodiments of the invention are set forth in the following description and in FIGS. 1–15 to provide a thorough understanding of these embodiments. One skilled in the art, however, will understand that the present invention may have additional embodiments, and that the invention may be practiced without several of the details described below.

Figure 1:
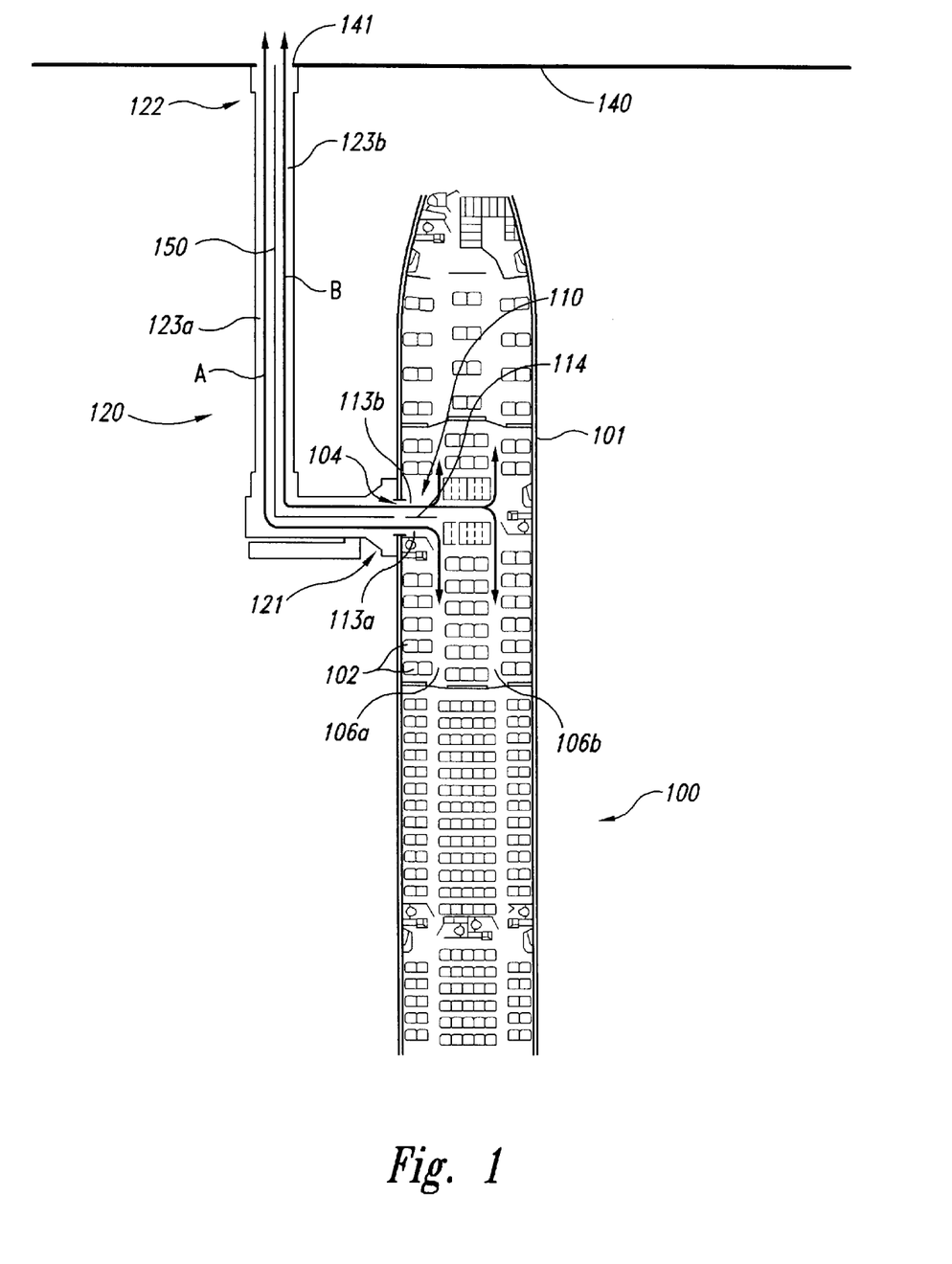
FIG. 1 is a cross-sectional plan view of a portion of an aircraft positioned adjacent to a walkway in accordance with an embodiment of the invention.

FIG. 1 is a partially schematic, cross-sectional plan view of a portion of an aircraft 100 positioned adjacent to a terminal structure 140. The aircraft 100 can include a fuselage 101 having seats 102 arranged in two seating aisles 106 (shown in FIG. 1 has a first seating aisle 106a and a second seating aisle 106b). The aircraft 100 can further include a doorway 104 and an entry region 110 that provides access between the doorway 104 and the seating aisles 106.

The terminal structure 140 can include a terminal doorway 141 and a walkway 120 positioned between the terminal doorway 141 and the aircraft doorway 104. Accordingly, the walkway 120 can include an enclosed ramp having a first portion 121 that is movably positioned adjacent to the aircraft doorway 104, and a second portion 122 that is fixedly attached to the terminal structure 140. The first portion 121 can move toward the aircraft 100 for loading and unloading, and away from the aircraft 100 prior to departure.

In one aspect of the arrangement shown in FIG. 1, the walkway 120 and/or the entry region 110 of the aircraft 100 can be configured to group passengers into two separate lines as they move between the seating aisles 106 and the terminal doorway 141. For example, the walkway 120 can include a walkway restriction 150 that forms two walkway aisles 123 (shown as a first walkway aisle 123a and a second walkway aisle 123b). The entry region 110 can include an entry restriction 114 that forms two entry aisles 113 (shown as a first entry aisle 113a and a second entry aisle 113b). Accordingly, passengers seated along the first seating aisle 106a can pass into and/or out of the aircraft 100 through the first entry aisle 113a and the first walkway aisle 123a (as indicated by arrow A), without interfering with the motion of passengers seated in the second seating aisle 106b, who can pass through the second entry aisle 113b and the second walkway aisle 123b (as indicated by arrow B). Further details of arrangements for facilitating this passenger flow are described below with reference to FIGS. 2–15.

Figure 2:
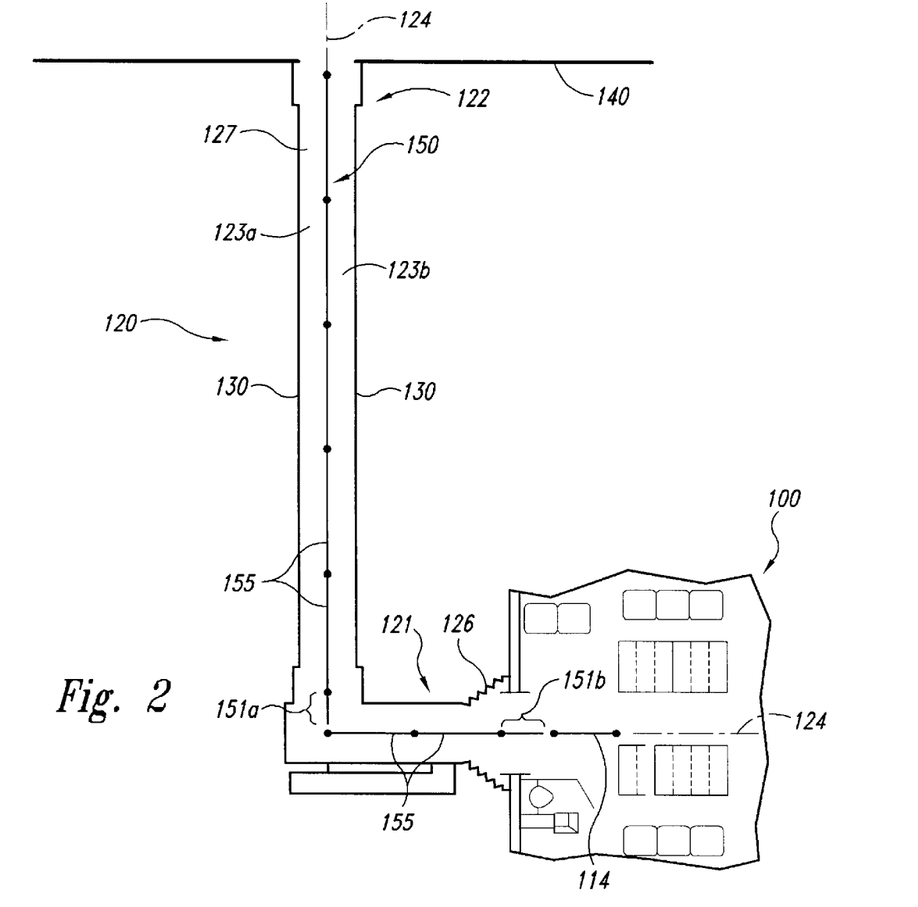
FIG. 2 is an enlarged plan view of a walkway in accordance with an embodiment of the invention.

FIG. 2 is an enlarged, cross-sectional plan view of an embodiment of the walkway 120 shown in FIG. 1. In one aspect of this embodiment, the walkway 120 can include a fixed pedestal bridge arrangement for which the second portion 122 is fixed relative to the terminal structure 140. The first portion 121 includes a telescoping section with a bellows 126 that can move toward and away from the aircraft 100, allowing the aircraft 100 to move toward and away from the terminal structure 140 without interference. The walkway 120 can be elongated along a walkway axis 124 that extends generally away from the terminal structure 140 and toward the aircraft 100.

In one aspect of this embodiment, the walkway 120 can include a floor portion 127, two facing wall portions 130 extending upwardly from the floor portion 127 and a ceiling portion (not visible in FIG. 2) positioned above the floor portion 127. The wall portions 130 can be spaced apart from each other by a distance sufficient to allow two people to walk abreast through the walkway 120. For example, the walkway 120 can have a width transverse to the longitudinal axis 124 that is about 50 inches or greater in one embodiment and about 60 inches or greater in another embodiment.

In a further aspect of this embodiment, the walkway restriction 150 can be mounted to the floor portion 127 and can be aligned generally with the walkway axis 124. In other embodiments, the walkway restriction 150 can depend from other portions of the walkway 120, such as the ceiling portion, as described in greater detail below with reference to FIG. 8. In any of these embodiments, the walkway restriction 150 can include a plurality of segments 155 positioned adjacent to each other. In one embodiment, neighboring segments 155 can abut against each other. In another embodiment, neighboring segments 155 can be spaced apart from each other, for example, when neighboring segments 155 move relative to each other during movement of the walkway 120. An extension portion 151a can span at least part of the gap between spaced apart segments 155. Another extension portion 151b can project from the walkway 120 into the aircraft 100. One feature of the extension portion 151b that projects into the aircraft 100 is that it can allow the entry restriction 114 (described in greater detail below with reference to FIGS. 10–15) to be reduced in size or eliminated entirely.

Figure 3:
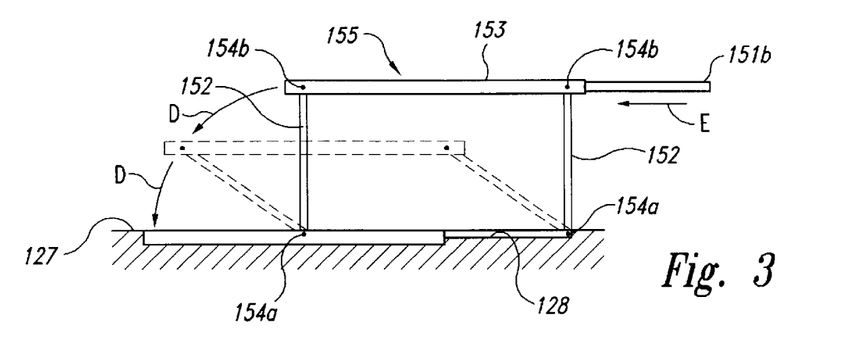
FIG. 3 is a partially schematic, side elevation view of a walkway restriction in accordance with an embodiment of the invention.
Figure 4:
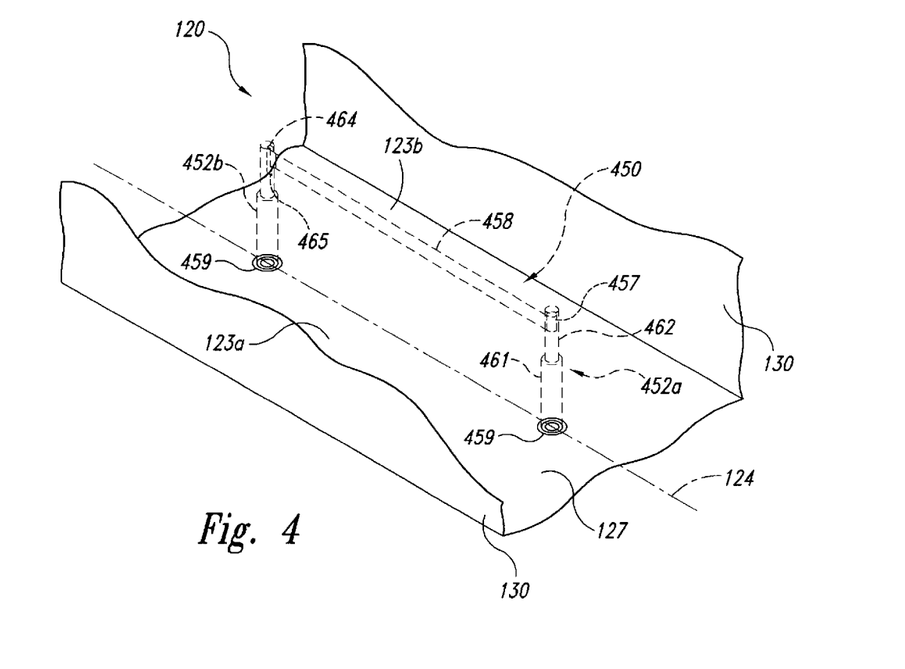
FIG. 4 is a partially schematic, cutaway isometric view of a portion of a walkway having a walkway restriction in accordance with another embodiment of the invention.

FIG. 3 is a partially schematic, side elevational view of a segment 155 of the walkway restriction 150 configured in accordance with an embodiment of the invention. In one aspect of this embodiment, the segment 155 can include two upright members 152 that are pivotably coupled to the floor portion 127 with pivot joints 154a. A handrail 153 is pivotably coupled to each of the upright members 152 with pivot joints 154b. The floor portion 127 can include a recess 128 configured to receive the upright members 152 and the handrail 153 when the segment 155 is folded downwardly, as indicated by arrows D. Accordingly, the segment 155 can be moved between a deployed position (shown in solid lines in FIG. 3) and a retracted position in which the segment 155 is recessed below the surface of the floor portion 127 in the recess 128. The segment 155 is shown midway between the deployed position and the retracted position in phantom lines in FIG. 3. When the segment 155 includes an extension portion 151b, the extension portion 151b can be telescopically connected to the handrail 153 and can be retracted within the handrail 153 when the segment 155 is moved to its retracted position, as indicated by arrow E.

In other embodiments, the walkway restriction 150 can have other arrangements. For example, the walkway restriction 150 can have configurations other than a pivotable configuration that also allow the walkway restriction 150 to move between a deployed position and an undeployed position. In another embodiment, the walkway restriction 150 can include a continuous, unsegmented structure. In still further embodiments, the walkway 150 can be rigidly attached to the walkway 120, rather than being movable between a deployed position and an undeployed position.

One feature of an embodiment of the aircraft 100 and the walkway 120 described above with reference to FIGS. 1–3 is that the walkway restriction 150 and the entry restriction 114 can allow passengers to form two independently moving lines as they move to and from the twin seating aisles 106 during loading and unloading. This arrangement can be optionally facilitated by widening the doorway 104, as described in greater detail below with reference to FIGS. 11–15. An advantage of separating passengers moving between the aircraft 100 and the terminal structure 140 into two lines is that this can reduce the time required to load and unload the aircraft 100. For example, in one embodiment in which the aircraft 100 has a seating capacity of 226 passengers, it is estimated that the time required to deplane passengers can be reduced by about 1 minute and the time to enplane passengers can be reduced by about 6.7 minutes, compared to existing single-line deplaning and enplaning arrangements. If the aircraft 100 has a baseline turnaround of about 59 minutes, this feature can reduce the turnaround time for the aircraft by about 13 percent. In other embodiments, the relative reduction in turnaround time can have other values.

Another feature of an embodiment of the walkway restriction 150 described above with reference to FIGS. 1–3 is that it can be moved between a deployed position and a retracted position. An advantage of this feature is that the same walkway 120 can be configured to support twin line loading/unloading (by deploying the walkway restriction 150) and single line loading/unloading (by retracting the walkway restriction 150). Accordingly, the walkway 120 can be versatile enough to service both twin aisle and single aisle commercial aircraft.

Yes another feature of the walkway restriction 150 is that it can be relatively simple to retrofit into existing walkways 120. For example, floor-mounted walkway restrictions 150 can be added to existing walkways 120 by coupling the walkway restrictions 150 to the floor portion 127 and, optionally, increasing the load-bearing capacity of the floor portion 127, for example, with structural reinforcements. An advantage of this feature is that adding the twin line loading feature to existing airport structures may not require substantial capital investments by airlines or airports.

Still another feature of an embodiment of the walkway restriction 150 described above with reference to FIGS. 1–3 is that it can include an extension portion 151b that extends into the aircraft 100. An advantage of this feature is that the walkway 120 can add the twin line loading/unloading feature to twin aisle aircraft that do not have an entry restriction 114.

FIGS. 4–8 illustrate walkway restrictions in accordance with other embodiments of the invention. Beginning with FIG. 4, a walkway restriction 450 can move telescopically between a deployed position (shown in phantom lines in FIG. 4) and a retracted position (shown in solid lines in FIG. 4). In one aspect of this embodiment, the walkway restriction 450 can include upright members 452 (shown as a first upright member 452a and a second upright member 452b) that retract into receptacles 459 positioned in the floor portion 127 of the walkway 120. Each upright member 452 can include an inner shaft 462 telescopically received in an outer shaft 461, both of which are received in the receptacle 459. In another embodiment, each upright member 452 can include a single shaft, or more than two nested shafts. In any of these embodiments, the first upright member 452a can have an extendable barrier 458 (such as a fabric band) initially rolled up on a spring-loaded reel 457. The end of the extendable barrier 458 can include a key 465 that can be releasably placed in a slot 464 of the second upright member 452b. Accordingly, the extendable barrier 458 can be unwound from the reel 457 and attached to the slot 464 when the upright members 452 are deployed. The extendable barrier 458 can be rewound on the reel 457 prior to retracting the upright members 452 into the receptacles 459.

Figure 5:
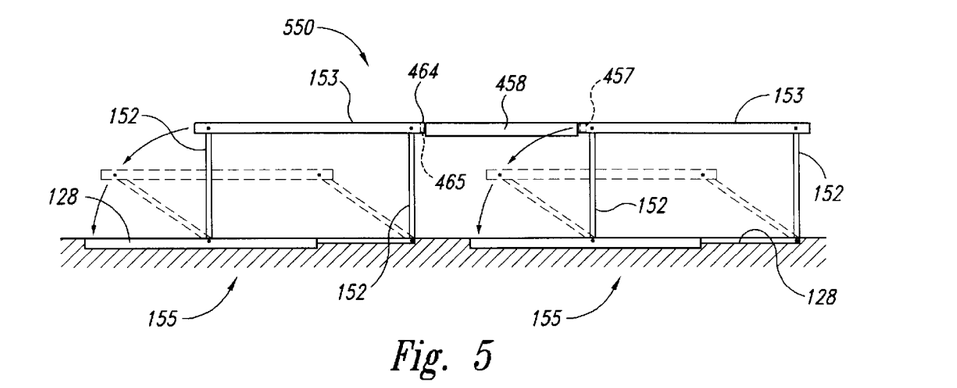
FIG. 5 is a partially schematic, side elevation view of a walkway restriction in accordance with yet another embodiment of the invention.

FIG. 5 is a side elevation view of an embodiment of a restriction 550 that includes features of both the walkway restriction 150 described above with reference to FIG. 3 and the walkway restriction 450 described above with reference to FIG. 4. In one aspect of this embodiment, the walkway restriction 550 can include two spaced apart segments 155, each having a pair of upright members 152 connected to a handrail 153 and movable between a deployed position (shown in solid lines in FIG. 5) and a retracted position in which the segments 155 are received in recesses 128 in the walkway 120. The walkway restriction 550 can further includes an extendable barrier 458 that extends between the two segments 155 in a manner generally similar to that described above with reference to FIG. 4. For example, the extendable barrier 458 can include a fabric band wound on a reel 457 positioned in the handrail 153 or in one of the upright members 152 of one segment 155. The extendable barrier 458 can further include a key 465 that is received in a corresponding slot 464 located in the handrail 153 or in the upright member 152 of the neighboring segment 155. Because the extendable barrier 458 has an adjustable length, it can be used to connect segments 155 that may be positioned on portions of the walkway 120 that move relative to each other. Details of an embodiment of a walkway having such an arrangement are described below with reference to FIG. 10.

Figure 6:
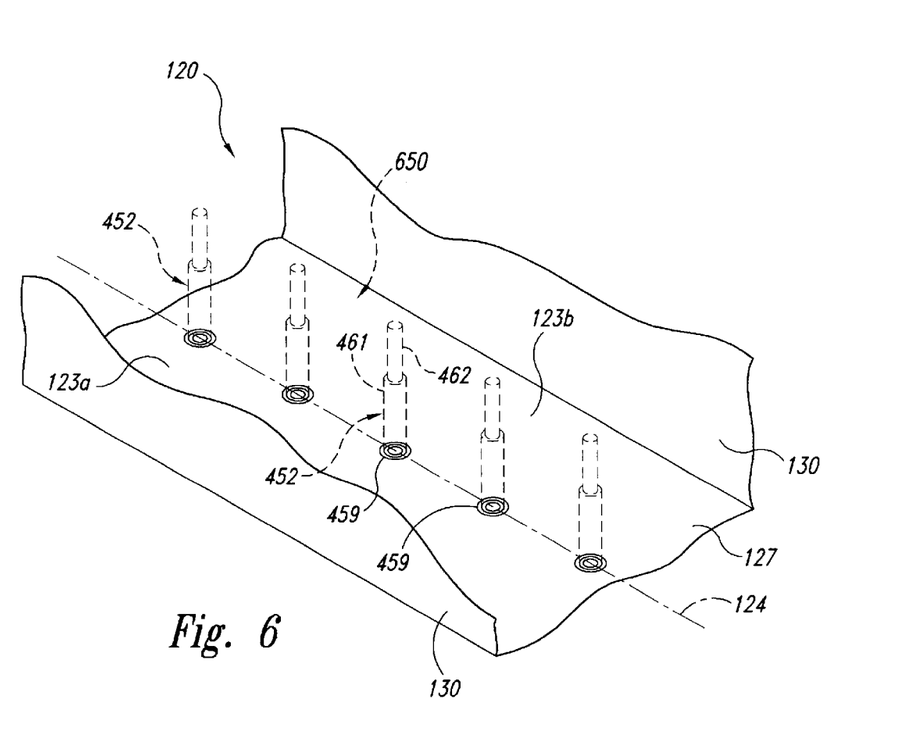
FIG. 6 is a partially schematic, cutaway isometric view of a portion of a walkway having a walkway restriction in accordance with still another embodiment of the invention.

FIG. 6 is partially schematic, cutaway isometric view of a walkway restriction 650 positioned in the walkway 120 in accordance with another embodiment of the invention. In one aspect of this embodiment, the walkway restriction 650 can include a plurality of upright members 452 positioned along the walkway axis 124 and telescopically received in a corresponding plurality of receptacles 459. In one embodiment, each upright member 652 can include an inner shaft 462 slidably received in an outer shaft 461. In another embodiment, each upright member 452 can include more or fewer than two shafts. In any of these embodiments, the upright members 452 can be positioned close enough to each other to at least restrict access between the first walkway aisle 123a and the second walkway aisle 123b without requiring an extendable barrier between adjacent upright members 452.

Figure 7:
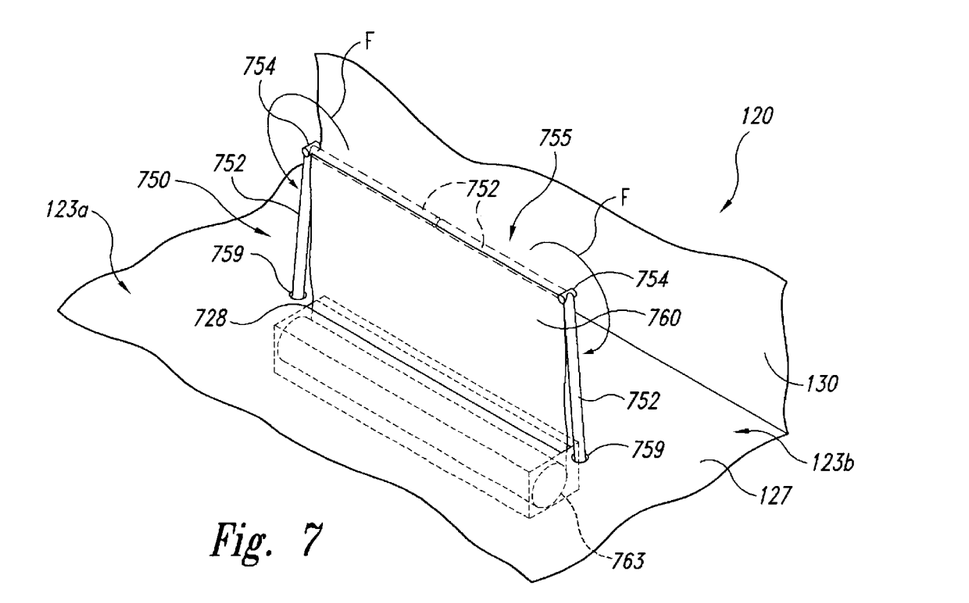
FIG. 7 is a partially schematic, cutaway isometric view of a walkway having a restriction that includes a flexible sheet in accordance with yet another embodiment of the invention.

FIG. 7 is a partially schematic, isometric view of a walkway restriction 750 having one or more upwardly extending flexible sheets 760 positioned in the walkway 120 in accordance with another embodiment of the invention. In one aspect of this embodiment, the walkway restriction 750 can include a plurality of segments 755, one of which is shown in FIG. 7. Each segment 755 can include a flexible sheet 760 that is initially wound on a roller 763 positioned in a recess 728 in the floor portion 127 of the walkway 120. Two upright members 752 are pivotably coupled to the flexible sheet 760 at pivot joints 754 and are initially folded over the end of the flexible sheet 760 (as shown in phantom lines in FIG. 7) when the flexible sheet 760 is stowed in the recess 728. To deploy the walkway restriction 750, the flexible sheet 760 is at least partially unrolled from the roller 763 so as to extend upwardly from the recess 728, and the upright members 752 are rotated outwardly, as indicated by arrows F and positioned in receptacles 759 in the floor portion 127. Accordingly, the upright members 752 can support the flexible sheet 760 in an upright orientation to at least restrict access between the first walkway aisle 123a and the second walkway aisle 123b. The sheet 760 can include any suitable rollable material and can be opaque in one embodiment or transparent or translucent in other embodiments.

Figure 8:
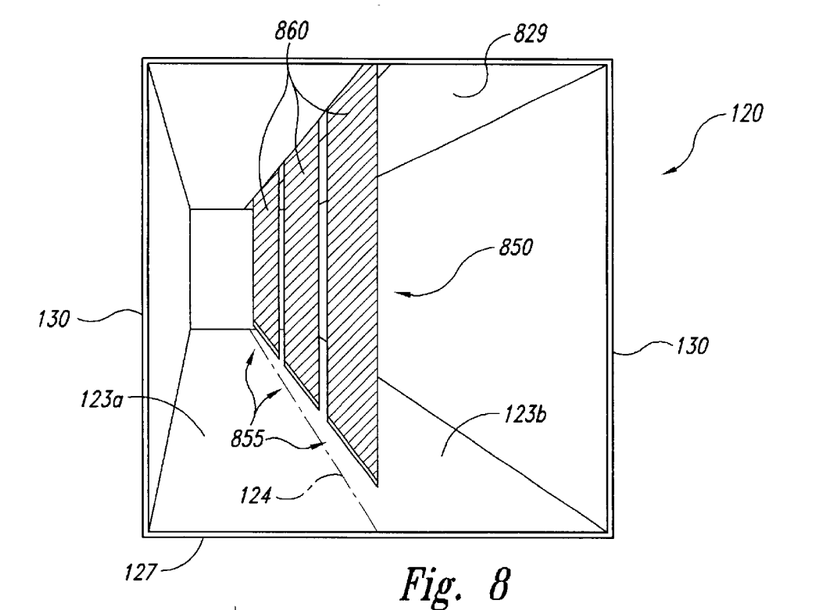
FIG. 8 is a partially schematic, isometric view of a restriction depending from a walkway ceiling in accordance with another embodiment of the invention.

In still further embodiments, any of the walkway restrictions described above with reference to FIGS. 1–7 can be fixedly attached to the walkway 120 and/or can depend from portions of the walkway 120 other than the floor portion 127. For example, as shown in FIG. 8, the walkway 120 can include a ceiling portion 829 positioned above the floor portion 127, and a restriction 850 can depend from the ceiling portion 829. In one aspect of this embodiment, the restriction 850 can include a plurality of segments 855, each of which includes a flexible sheet 860 that can be pulled down from a stowed position (with the flexible sheet 860 at least partially retracted into the ceiling portion 829) to a deployed position (shown in FIG. 8), generally in the manner of a projection screen or window shade. Accordingly, the restriction 850 can restrict and/or prevent access between the first walkway aisle 123a and the second walkway aisle 123b. In other embodiments, the restriction 850 can have other arrangements. For example, the restriction 850 can include upright members and a transverse member (generally similar to but inverted from those described above with reference to FIG. 3) that retract into the ceiling portion 829 by folding or by moving linearly vertically into ceiling recesses.

Figure 9:
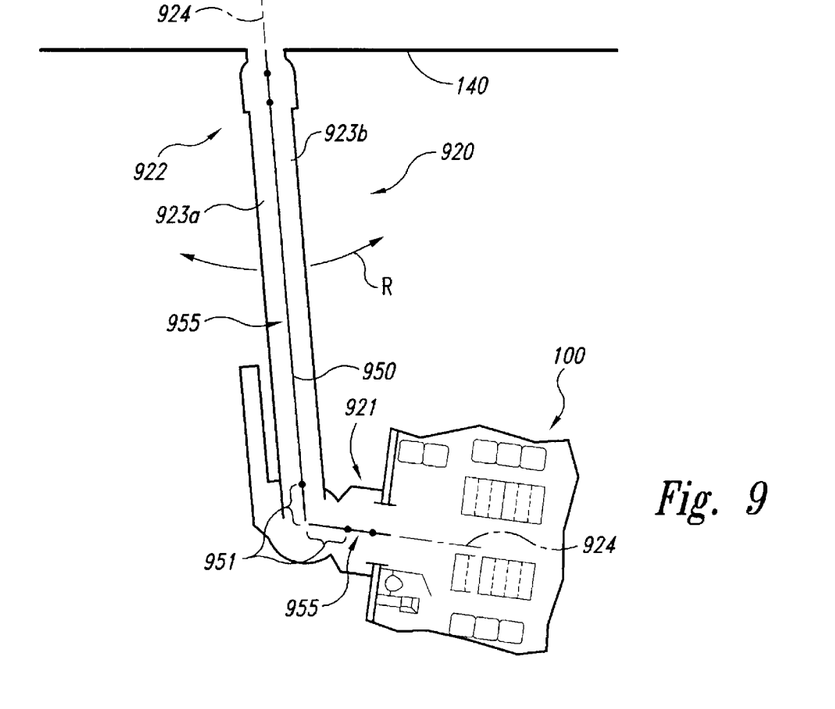
FIG. 9 is a cross-sectional plan view of a pivotable walkway having a restriction in accordance with another embodiment of the invention.

FIGS. 9–11 illustrate walkways having configurations in accordance with other embodiments of the invention, and restrictions generally similar to one or more of those described above with reference to FIGS. 1–8. For example, FIG. 9 illustrates a walkway 920 having a radial bridge construction. Accordingly, the walkway 920 can include a first portion 921 configured to be positioned adjacent to the aircraft 100, and a second portion 922 configured to couple to the terminal structure 140. The first and second portions 921 and 922 can rotate relative to the terminal structure 140 (as indicated by arrow R) to move toward and away from the aircraft 100. The walkway 920 can be elongated along a walkway axis 924 and can include a restriction 950 generally aligned with the walkway axis 924 to divide the walkway 920 into a first walkway aisle 923a and a second walkway aisle 923b. The restriction 950 can include any of the structures described above with reference to FIGS. 1–8. In a further aspect of this embodiment, adjacent segments 955 of the walkway restriction 950 can include extension portions 951 to maintain the separation between the first walkway aisle 923a and the second walkway aisle 923b while accounting for relative motion of portions of the walkway 920.

Figure 10:
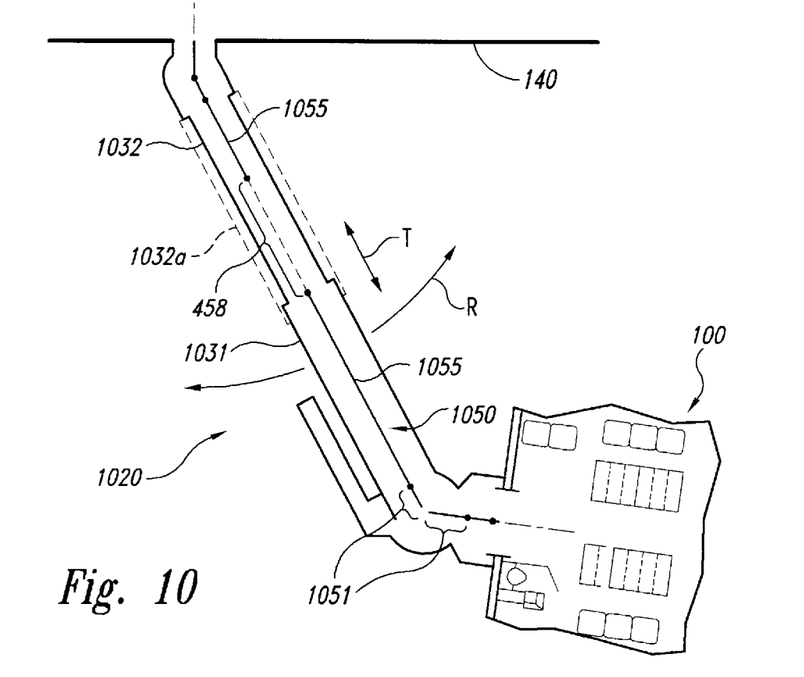
FIG. 10 is a cross-sectional plan view of a pivotable and telescoping walkway having a restriction in accordance with another embodiment of the invention.

FIG. 10 is a partially schematic, cross-sectional plan view of a walkway 1020 having an apron-drive bridge arrangement in accordance with another embodiment of the invention. Accordingly, the walkway 1020 can include a first section 1031 that telescopically receives a second section 1032 so as to move axially toward and away from the terminal structure 140 (as indicated by arrow T). The first section 1031 and the second section 1032 can also pivot radially (as indicated by arrow R) relative to the terminal structure 140, providing two degrees of motion with which to align the walkway 1020 relative to the aircraft 100. In another arrangement, an existing second section 1032 that is received in the first section 1031 can be replaced with an alternative second section 1032a (shown in FIG. 10 in dashed lines) to provide additional width for accommodating two side-by-side aisles 1023a and 1023b. In one aspect of this embodiment, the alternative second section 1032a can be retrofitted to the walkway 1020 without requiring that the first section 1031 be replaced.

In another aspect of an embodiment shown in FIG. 10, the walkway 1020 can include a walkway restriction 1050. The walkway restriction 1050 can include segments 1055 that are fixed to the first section 1031 and the second section 1032 and are movable between a deployed position and a stowed position. The walkway 1020 can further include an extendable barrier 458 that extends between the fixed segments 1055 and can account for relative axial motion of the first section 1031 relative to the second section 1032. Accordingly, the walkway restriction 1050 can have an arrangement generally similar to that described above with reference to FIG. 5. The walkway restriction 1050 can also include extensions 1051 that operate in a manner generally similar to that described above with reference to the extensions 151a and 151b shown in FIGS. 2 and 3. In other embodiments, the walkway restriction 1050 can have other arrangements that can be selectively or adjustably deployed to account for movement between the first section 1031 and the second section 1032 of the walkway 1020.

Figure 11:
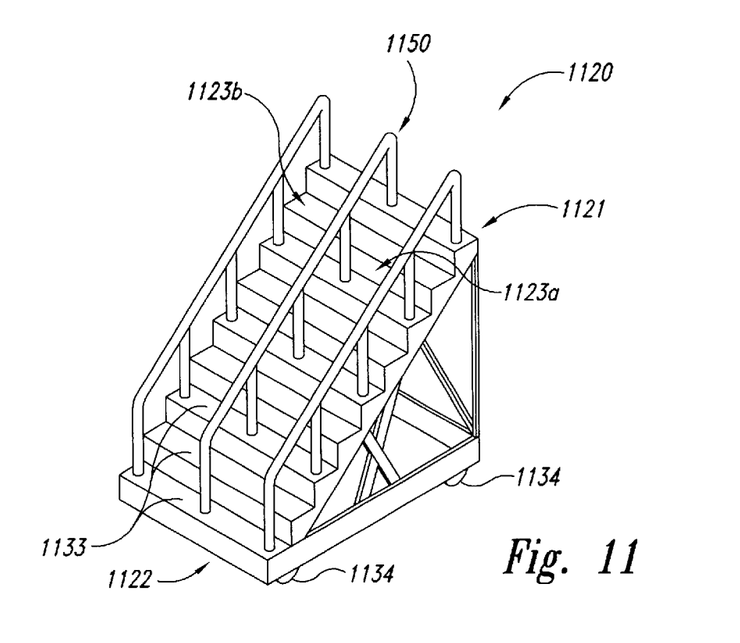
FIG. 11 is a partially schematic isometric view of a walkway having stairs and a restriction in accordance with another embodiment of the invention.

FIG. 11 is an isometric illustration of a walkway 1120 having stairs 1133 in accordance with another embodiment of the invention. The walkway 1120 can include a first portion 1121 configured to be positioned adjacent to an aircraft 100 (FIG. 1) and a second portion 1122 positioned at or near ground level. The walkway 1120 can include a restriction 1150, such as a rigid handrail, attached to the walkway 1120 to divide the walkway into a first walkway aisle 1123a and a second walkway aisle 1123b. In another embodiment, the restriction 1150 can be movable between a deployed position and retracted position. For example, the restriction 1150 can include a plurality of upright members generally similar to the upright members 452 described above with reference to FIG. 6. In other embodiments, the restriction 1150 can have other configurations. In any of these embodiments, the walkway 1120 can be positioned on wheels 1134 so as to be moved to and from an aircraft, and can be open (as shown in FIG. 11) or fitted with a cover or awning.

Figure 12:
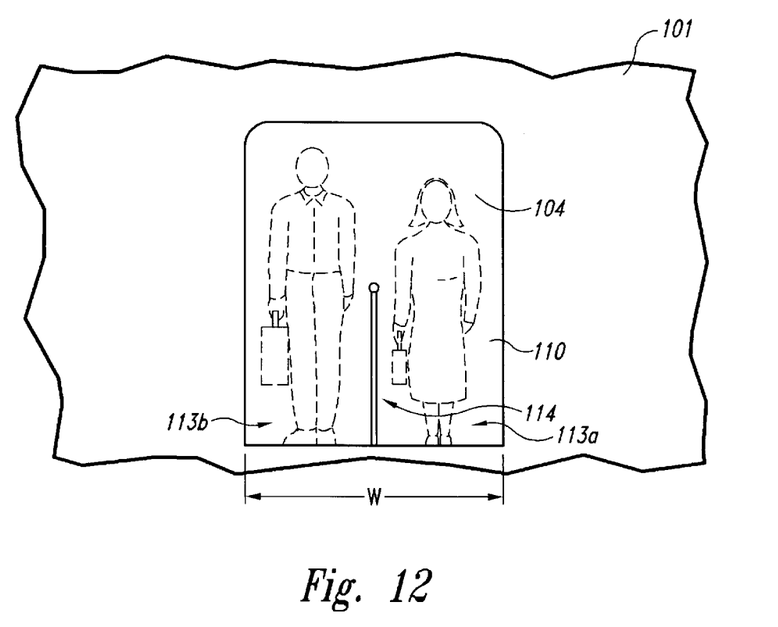
FIG. 12 is a side elevation view of a portion of an aircraft fuselage having a doorway in accordance with an embodiment of the invention.

FIGS. 12–15 illustrate features of the aircraft 100 that can facilitate twin line passenger loading and unloading in accordance with embodiments of the invention. FIG. 12 is a side view of the aircraft fuselage 101, with the doorway 104 open to allow access to the entry region 110 within the aircraft. The entry restriction 114 is positioned at least proximate to the doorway 104 to divide the entry region into a first entry aisle 113a and a second entry aisle 113b. In one aspect of this embodiment, the doorway 104 can have a width W that is greater than the standard aircraft doorway width. For example, most existing aircraft have passenger doorways with a width of 42 inches. In one embodiment, the doorway 104 can have a width of at least 50 inches. In another embodiment, the doorway 104 can have a width W of at least 60 inches. Accordingly, the doorway 104 can more easily accommodate two passengers walking abreast.

Figure 13:
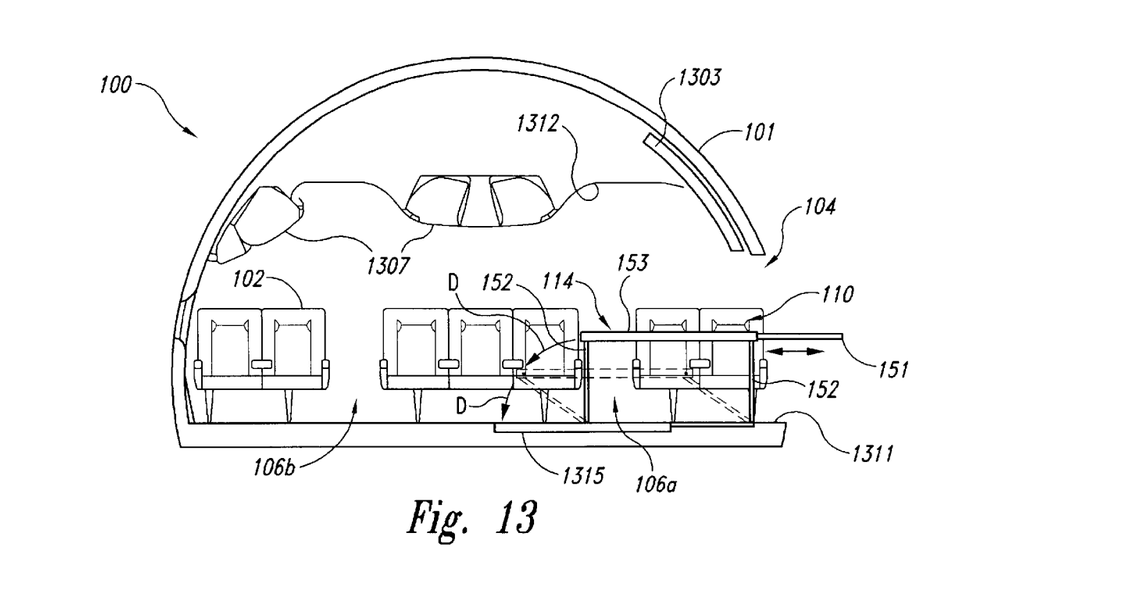
FIG. 13 is a partially schematic, cross-sectional end view of an aircraft fuselage having an entry region with a restriction in accordance with an embodiment of the invention.

FIG. 13 is a partially schematic, cross-sectional view of the fuselage 101, which includes a floor portion 1311 and a ceiling portion 1312 positioned above the floor portion 1311. The floor portion 1311 can support the seats 102 adjacent to the first and second seating aisles 106a, 106b. The ceiling portion 1312 can include overhead bins 1307 in a conventional arrangement. A door 1303 is movably positioned within the doorway 104 and can be retracted into the ceiling portion 1312 when open. In another embodiment (for example, when the door 1303 is less than half as wide as an adjacent walkway), the door 1303 can open outwardly and can fold against the outer surface of the fuselage 101. In either embodiment, the door 1303 can open the doorway 104 and allow passengers to pass into or out of the aircraft 100 adjacent to the entry restriction 114.

The entry restriction 114 can include any of the arrangements described above with reference to FIGS. 1–8. In one particular embodiment, the entry restriction 114 can include two upright members 152 pivotably connected to a handrail 153 and configured to operate in a manner generally similar to the walkway restriction 150 described above with reference to FIG. 3. Accordingly, the entry restriction 114 can move between a deployed position (shown in solid lines in FIG. 13) and a retracted position in which the entry restriction 114 is received in a recess 1315 of the floor portion 1311. The entry restriction 114 can also include an extension portion 151 that can deploy to extend outwardly through the doorway 104 and into an adjacent walkway (not shown in FIG. 13). Accordingly, the entry restriction 114 can maintain the separation between first aisle 106a and the second aisle 106b for at least a short distance outside the aircraft 100, even if the adjacent walkway does not have a walkway restriction.

In other embodiments, the entry restriction 114 can have other configurations. For example, the entry restriction 114 can include a plurality of upright members without handrails generally similar to the arrangement described above with reference to FIG. 6. In other embodiments, the entry restriction 114 can include a planar sheet, such as those described above with reference to FIGS. 7 and 8. In any of these embodiments, the entry restriction 114 can depend from the floor portion 1311, or other parts of the fuselage 101, such as the ceiling portion 1312. The entry restriction 114 can be fixedly mounted in the fuselage 101, or the entry restriction 114 can be moveable between a deployed position (used during passenger loading and unloading) and a stowed position (used during taxi, takeoff, flight and landing), as indicated by arrow D.

Figure 14:
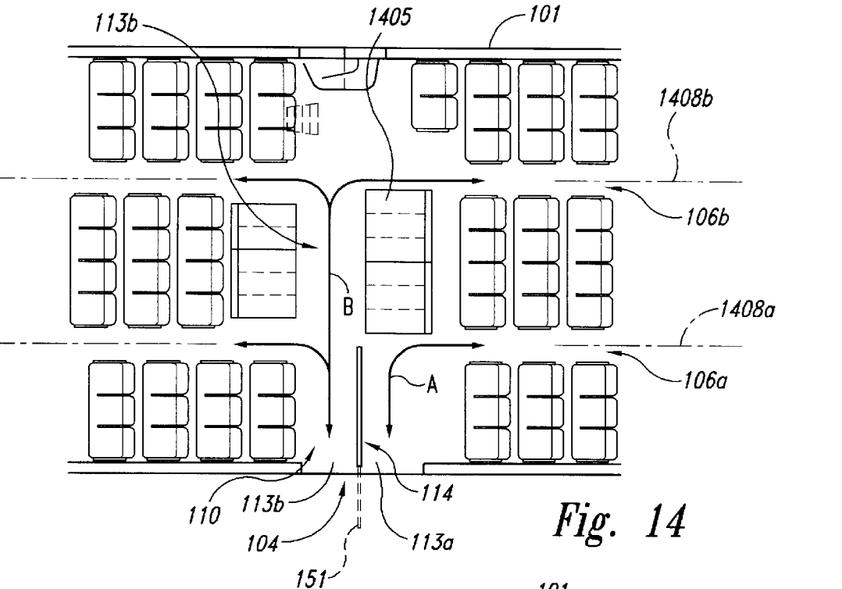
FIG. 14 is a partially schematic, cross-sectional plan view of a portion of an aircraft fuselage having an entry region with a restriction in accordance with an embodiment of the invention.

FIG. 14 is an enlarged, top plan view of a portion of the fuselage 101 described above with reference to FIGS. 1 and 13. As shown in FIG. 14, the first seating aisle 106a can extend along a first seat aisle axis 1408a forward and aft of the doorway 104. The second seating aisle 106b can extend along a second seat aisle axis 1408b forward and aft of the doorway 104. In one embodiment, a galley 1405 can be positioned between the first and second seating aisles 106a,b adjacent to the entry region 110 and can maintain the separation between the first entry aisle 113a and the second entry aisle 113b. Alternatively, the entry restriction 114 alone can be configured to maintain the division between the first entry aisle 113a and the second entry aisle 113b, without the galley 1405. In either embodiment, passengers seated aft of the doorway 104 along the first seating aisle 106a can pass through the first entry aisle 113a (as indicated by arrow A), and passengers seated in the second aisle 106b (and the first aisle 106a forward of the doorway 104) can pass through the second entry aisle 113b (as indicated by arrow B).

Figure 15:
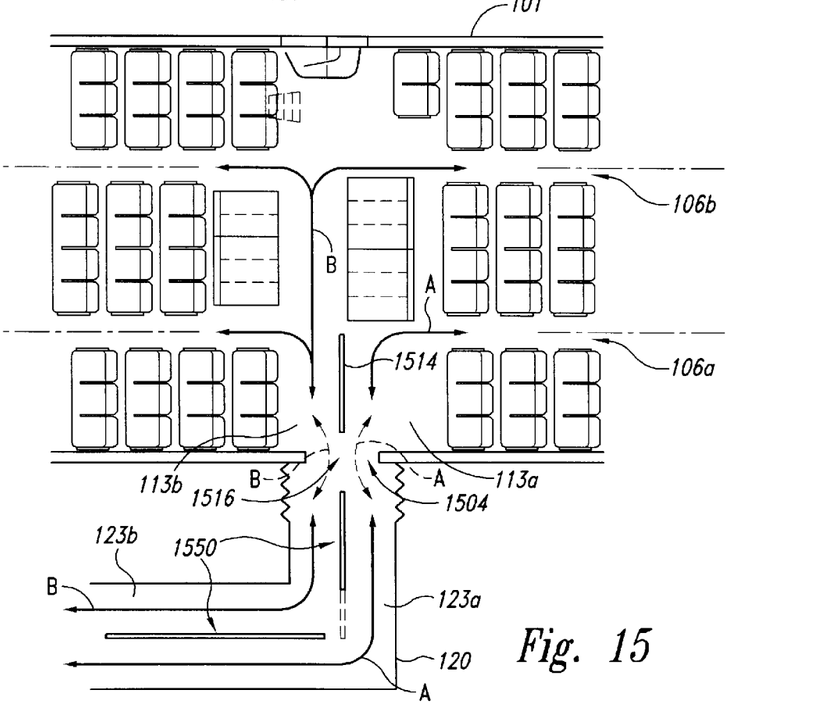
FIG. 15 is a partially schematic, cross-sectional plan view of a portion of an aircraft fuselage positioned adjacent to a walkway and having a doorway and an entry restriction in accordance with still another embodiment of the invention.

FIG. 15 is a top plan view of the fuselage 101 having an entry restriction 1514, and the walkway 120 having a walkway restriction 1550, both in accordance with another embodiment of the invention. In one aspect of this embodiment, the entry restriction 1514 and the walkway restriction 1550 can each be recessed away from a doorway 1504 of the fuselage 101 to leave a restriction gap 1516 between the entry restriction 1514 and the walkway restriction 1550. Accordingly, neither the entry restriction 1514 nor the walkway restriction 1550 extend to or through the doorway 1504. This arrangement can be suitable for aircraft 100 having relatively narrow doorways 1504 (such as a standard 42 inch wide doorway). When the doorway 1504 is not wide enough to accommodate two passengers walking abreast, passengers moving between the first walkway aisle 106a and the first entry aisle 113a can alternate with passengers passing between the second walkway aisle 123b and the second entry aisle 113b, as indicated by the phantom portions of arrows A and B. Although this arrangement is not as efficient as one in which the doorway can accommodate two passengers walking abreast, the flow of passengers can be improved over existing arrangements in which the fuselage 101 lacks an entry restriction 1514 and the walkway 120 lacks a walkway restriction 1550.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:
1. An aircraft, comprising:
   a fuselage having a passenger doorway;
   a passenger door positioned in the passenger doorway and movable between an open position and a sealably closed position;
   an entry region positioned within the fuselage adjacent to the passenger doorway, the entry region having a width configured to accommodate at least two people walking abreast;
   a plurality of seats positioned within the fuselage and arranged along a first aisle having a first aisle axis and a second aisle having a second aisle axis, the second aisle axis being spaced apart transversely from the first aisle axis, each aisle being accessible from the entry region; and
   a restriction positioned in the entry region at least proximate to the passenger doorway, the restriction being movable between a deployed position and a stowed position, wherein the restriction in the deployed position divides the entry region into a first portion accessible to the first aisle and a second portion accessible to the second aisle, the restriction at least restricting movement of people between the first portion and the second portion, and wherein the restriction is configured to be placed in a stowed position after each loading operation.

2. The aircraft of claim 1 wherein the restriction includes a reel and a flexible, coilable, elongated barrier extendibly coiled on the reel.

3. The aircraft of claim 1 wherein the restriction includes a first upright member, a second upright member, and a handrail extending between the upright members.

4. The aircraft of claim 1 wherein the first and second aisles extend forward and aft of the entry region.

5. The aircraft of claim 1 wherein the fuselage includes a floor portion and a ceiling portion positioned above the floor portion, and wherein the restriction depends from the floor portion.

6. The aircraft of claim 1 wherein the fuselage includes a floor portion and a ceiling portion, and wherein the restriction depends from the ceiling portion.

7. The aircraft of claim 1 wherein the restriction includes a plurality of spaced apart upright members.

8. The aircraft of claim 1 wherein the fuselage includes a floor portion and a ceiling portion positioned above the floor portion, and wherein the restriction includes a plurality of spaced apart upright members with each upright member being movable between a deployed position and a stowed position, the upright members projecting upwardly from the floor portion when in the deployed position, the upright members being at least partially retracted into the floor portion when in the stowed position.

9. The aircraft of claim 1 wherein the restriction includes a generally planar, flexible sheet.

10. The aircraft of claim 1 wherein the restriction includes a roller and a generally planar, flexible sheet wound on the roller and movable relative to the roller between a deployed position and a stowed position, the sheet being at least partially unwound from the roller to at least restrict access between the first and second portions of the entry region when the sheet is in the deployed position, the sheet being at least partially wound on the roller to allow access between the first and second portions of the entry region when the sheet is in the stowed position.

11. The aircraft of claim 1 wherein the entry region has a floor portion and wherein the restriction includes first and second upright members pivotably coupled to the floor portion, the restriction further including a handrail pivotably coupled to the first and second upright members, and wherein the restriction is pivotable between a deployed position and a stowed position, with the upright members generally upright when the restriction is in the deployed position, and with the upright members at least partially recessed in the floor portion when the restriction is in the stowed position.

12. The aircraft of claim 1 wherein the restriction includes an extension that is movable between an extended position and a retracted position, with the extension projecting through the doorway when in the extended position.

13. An aircraft, comprising:
  a fuselage having a passenger doorway, the passenger doorway having a width configured to accommodate at least two people walking abreast;
  an entry region positioned within the fuselage adjacent to the passenger doorway;
  a plurality of seats positioned within the fuselage and arranged along a first aisle having a first aisle axis and a second aisle having a second aisle axis, the second aisle axis being spaced apart transversely from the first aisle axis, each aisle being accessible from the entry region;
  a passenger door movably positioned in the passenger doorway; and
  a restriction positioned in the entry region at least proximate to the passenger doorway, the restriction being movable between a deployed position and a stowed position, wherein the restriction divides the entry region into a first portion accessible to the first aisle and a second portion accessible to the second aisle, the restriction at least restricting movement of passengers between the first and second portions, and wherein the restriction is configured to be placed in the stowed position after each loading operation.

14. The aircraft of claim 13 wherein the restriction includes an extension that is movable between an extended position and a retracted position, with the extension projecting through the doorway when in the extended position.

15. The aircraft of claim 13 wherein the restriction includes a first upright member, a second upright member, and a handrail extending between the upright members.

16. The aircraft of claim 13 wherein the restriction includes a first upright member, a second upright member, a reel housed in at least one of the upright members, and a flexible, coilable, elongated barrier extendibly coiled on the reel.

17. The aircraft of claim 13 wherein the fuselage includes a floor portion and a ceiling portion positioned above the floor portion, and wherein the restriction depends from the floor portion.

18. The aircraft of claim 13 wherein the fuselage includes a floor portion and a ceiling portion, and wherein the restriction depends from the ceiling portion.

19. The aircraft of claim 13 wherein the restriction includes a plurality of spaced apart upright members.

20. The aircraft of claim 13 wherein the fuselage includes a floor portion and a ceiling portion positioned above the floor portion, and wherein the restriction includes a plurality of spaced apart upright members with each upright member being movable between a deployed position and a stowed position, the upright members projecting upwardly from the floor portion when the restrictions are in the deployed position, the upright members being at least partially retracted into the floor portion when the upright members are in the stowed position.

21. The aircraft of claim 13 wherein the restriction includes a roller and a generally planar sheet wound on the roller and movable relative to the roller between a deployed position and a stowed position, the sheet being at least partially unwound from the roller to at least restrict access between the first and second portions of the entry region when the sheet is in the deployed position, the sheet being at least partially wound on the roller to allow access between the first and second portions of the entry region when the sheet is in the stowed position.

22. The aircraft of claim 13 wherein the fuselage has a floor portion and wherein the restriction includes first and second upright members pivotably coupled to the floor portion, the restriction further including a handrail pivotably coupled to the first and second upright members, and wherein the restriction is pivotable between a deployed position and a stowed position, with the upright members generally upright when the restriction is in the deployed position, and with the upright members at least partially recessed in the floor portion when the restriction is in the stowed position.

23. An aircraft, comprising:
  a fuselage extending along a fuselage axis and having a passenger doorway, the passenger doorway having a width configured to accommodate at least two people walking abreast;
  an entry region positioned within the fuselage adjacent to the passenger doorway, the entry region having a width configured to accommodate at least two people walking abreast, the entry region having a floor portion and a ceiling portion positioned above the floor portion;

a plurality of seats positioned within the fuselage and arranged along a first aisle and a second aisle, the first aisle having a first aisle axis generally parallel to the fuselage axis, the second aisle having a second aisle axis generally parallel to the fuselage axis, the second aisle axis being spaced apart transversely from the first aisle axis, each aisle being accessible from the entry region;

a passenger door positioned in the passenger doorway and movable between an open position and a sealably closed position; and a restriction positioned in the entry region at least proximate to the passenger doorway, the restriction depending from the floor portion and being movable between a deployed position and a stowed position, wherein when the restriction is in the deployed position, the restriction divides the entry region into a first portion accessible to the first aisle and a second portion accessible to the second aisle, with the restriction at least restricting movement of passengers between the first and second portions, and wherein when the restriction is in the stowed position, the restriction allows movement between the first and second portions of the entry region, wherein the restriction is configured to be placed in the stowed position after each loading operation.

24. The aircraft of claim 23 wherein the restriction includes a reel and a flexible, coilable, elongated barrier extendibly coiled on the reel.

25. The aircraft of claim 23 wherein the restriction includes a first upright member, a second upright member, and a handrail extending between the upright members.

26. The aircraft of claim 23 wherein the restriction includes a plurality of spaced apart upright members with each upright member being movable between a deployed position and a stowed position, the upright members projecting upwardly from the floor portion when the upright members are in the deployed position, the upright members being at least partially retracted into the floor portion when the restriction members are in the stowed position.

27. The aircraft of claim 23 wherein the restriction includes a roller and a generally planar, flexible sheet wound on the roller, the sheet being at least partially unwound from the roller to at least restrict access between the first and second portions of the entry region when the restriction is in the deployed position, the sheet being at least partially wound on the roller to allow access between the first and second portions of the entry region when the restriction is in the stowed position.

28. The aircraft of claim 23 wherein the restriction includes first and second upright members pivotably coupled to the floor portion, the restriction further including a handrail pivotably coupled to the first and second upright members, and wherein the restriction is pivotable between a deployed position and a stowed position, with the upright members generally upright when the restriction is in the deployed position, and with the upright members at least partially recessed in the floor portion when the restriction is in the stowed position.

29. The aircraft of claim 23 wherein the restriction includes an extension that is movable between an extended position and a retracted position, with the extension projecting through the doorway when in the extended position.

30. An aircraft, comprising:

a fuselage having a passenger doorway;

a passenger door positioned in the passenger doorway and movable between an open position and a sealably closed position;

a plurality of seats positioned within the fuselage and arranged along a first aisle having a first aisle axis and a second aisle having a second aisle axis, the second aisle axis being spaced apart transversely from the first aisle axis;

an entry region positioned within the fuselage adjacent to the passenger doorway; the entry region having a width configured to accommodate two passengers walking abreast, the entry region having a first portion accessible to the first aisle and a second portion accessible to the second aisle; and restriction means for at least restricting movement of passengers from the first portion of the entry region to the second portion of the entry region, the restriction means being movable between a deployed position and a stowed position, and wherein the restriction means are configured to be placed in the stowed position after each loading operation.

31. The aircraft of claim 30 wherein the restriction means include a first upright member, a second upright member, and a handrail extending between the upright members.

32. The aircraft of claim 30 wherein the restriction means include a first upright member, a second upright member, a reel housed in at least one of the upright members, and a flexible, coilable, elongated barrier extendibly coiled on the reel.

33. The aircraft of claim 30 wherein the fuselage includes a floor portion and a ceiling portion positioned above the floor portion, and wherein the restriction means depend from the floor portion.

34. The aircraft of claim 30 wherein the entry region includes a floor portion and a ceiling portion, and wherein the restriction means depend from the ceiling portion.

35. The aircraft of claim 30 wherein the restriction means includes a plurality of spaced apart upright members.

36. The aircraft of claim 30 wherein the fuselage includes a floor portion and a ceiling portion positioned above the floor portion, and wherein the restriction means includes a plurality of spaced apart restriction members with each restriction member being movable between a deployed position and a stowed position, the restriction members projecting upwardly from the floor portion when the restriction members are in the deployed position, the restriction members being at least partially retracted into the floor portion when the restriction members are in the stowed position.

37. The aircraft of claim 30 wherein the restriction means include a roller and a generally planar, flexible sheet wound on the roller and movable relative to the roller between a deployed position and a stowed position, the sheet being at least partially unwound from the roller to at least restrict access between the first and second portions of the entry region when the sheet is in the deployed position, the sheet being at least partially wound on the roller to allow access between the first and second portions of the entry region when the sheet is in the stowed position.

38. The aircraft of claim 30 wherein the fuselage has a floor portion and wherein the restriction means includes first and second upright members pivotably coupled to the floor portion, the restriction means further including a handrail pivotably coupled to the first and second upright members, and wherein the restriction means are pivotable between a deployed position and a stowed position, with the upright members generally upright when the restriction means are in the deployed position, and with the upright members at least partially recessed in the floor portion when the restriction is in the stowed position.

39. The aircraft of claim 30 wherein the restriction means includes an extension that is movable between an extended position and a retracted position, with the extension projecting through the doorway when in the extended position.

40. A method for manufacturing an aircraft, comprising:
providing a fuselage having a passenger doorway;
forming an entry region within the fuselage adjacent to the passenger doorway, the entry region having a width configured to accommodate at least two people walking abreast;
arranging a plurality of seats within the fuselage along a first aisle having a first aisle axis and a second aisle having a second aisle axis, the second aisle axis being spaced apart transversely from the first aisle axis, each aisle being accessible from the entry region;
positioning a passenger door in the passenger doorway, the passenger door being movable between an open position and a sealably closed position; and
positioning a restriction in the entry region at least proximate to the passenger doorway, the restriction being movable between a deployed position and a stowed position, wherein the restriction in the deployed position divides the entry region into a first portion accessible to the first aisle and a second portion accessible to the second aisle, the restriction at least restricting movement of passengers from the first portion to the second portion, and wherein the restriction is configured to be placed in the stowed position after each loading operation.

41. The method of claim 40 wherein positioning the restriction includes installing in the entry region a first upright member, a second upright member, and a handrail extending between the upright members.

42. The method of claim 40 wherein arranging a plurality of seats includes arranging the seats in first and second aisles that extend forward and aft of the entry region.

43. The method of claim 40 wherein the fuselage includes a floor portion and a ceiling portion positioned above the floor portion, and wherein positioning the restriction includes positioning the restriction to depend from the floor portion.

44. The method of claim 40 wherein the fuselage includes a floor portion and a ceiling portion, and wherein positioning the restriction includes positioning the restriction to depend from the ceiling portion.

45. The method of claim 40 wherein positioning the restriction includes installing a plurality of spaced apart upright members.

46. The method of claim 40 wherein the fuselage includes a floor portion and a ceiling portion positioned above the floor portion, and wherein positioning the restriction includes installing a plurality of spaced apart upright members with each upright member being movable between a deployed position and a stowed position, the upright members projecting upwardly from the floor portion when the upright members are in the deployed position, the upright members being at least partially retracted into the floor portion when the upright members are in the stowed position.

47. The method of claim 40 wherein positioning the restriction includes installing a generally planar, flexible sheet in the entry region.

48. The method of claim 40 wherein positioning the restriction includes installing in the entry region a roller and a generally planar sheet wound on the roller and movable relative to the roller between a deployed position and a stowed position, the sheet being at least partially unwound from the roller to at least restrict access between the first and second portions of the entry region when the sheet is in the deployed position, the sheet being at least partially wound on the roller to allow access between the first and second portions of the entry region when the sheet is in the stowed position.

49. The method of claim 40 wherein the fuselage has a floor portion and wherein positioning the restriction includes installing first and second upright members pivotably coupled to the floor portion, the restriction further including a handrail pivotably coupled to the first and second upright portions, and wherein the restriction is pivotable between a deployed position and a stowed position, with the upright members generally upright when the restriction is in the deployed position, and with the upright members at least partially recessed in the floor portion when the restriction is in the stowed position.

50. The method of claim 40 wherein positioning the restriction includes installing a restriction having an extension that is movable between an extended position and a retracted position, with the extension projecting through the doorway when in the extended position.

51. The method of claim 40 wherein positioning the restriction includes installing a restriction having a reel and a flexible, coilable, elongated barrier extendibly coiled on the reel.

52. A method for loading and/or unloading people from an aircraft, comprising:
providing an aircraft having a fuselage with a passenger doorway, a passenger door positioned proximate to the passenger doorway, an entry region positioned within the fuselage adjacent to the passenger doorway, and a plurality of seats positioned within the fuselage and arranged along a first aisle having a first aisle axis and a second aisle having a second aisle axis, the second aisle axis being spaced apart transversely from the first aisle axis, each aisle being accessible from the entry region; and
directing a first group of people to pass through the doorway and a first portion of the entry region accessible to the first aisle, and simultaneously directing a second group of people to pass through the doorway and a second portion of the entry region accessible to the second aisle, while at least restricting access between the first and second portions with a restriction positioned in the entry region, wherein the restriction is movable between a deployed position and a stowed position, the restriction being configured to be placed in a stowed position after each loading operation.

53. The method of claim 52, further comprising alternating between allowing people from the first group to pass through the doorway and allowing people from the second group to pass through the doorway.

54. The method of claim 52, further comprising allowing people from the first and second groups to pass simultaneously through the doorway.

55. The method of claim 52, further comprising:
directing the first and second groups of people to pass through a walkway positioned external to the aircraft and proximate to the doorway, the walkway being elongated along a longitudinal axis and having first and second walkway aisles arranged generally parallel with the longitudinal axis; and
directing the first group of people to pass through the first walkway aisle and simultaneously directing the second group of people to pass through the second walkway aisle while at least restricting access between the first and second aisles.

56. The method of claim 52 wherein at least restricting access between the first and second portions of the entry region includes at least restricting access with a restriction that includes a first upright member, a second upright member, and a handrail extending between the upright members.

57. The method of claim 52 wherein at least restricting access between the first and second portions of the entry region includes at least restricting access with a restriction that depends from a floor portion of the entry region.

58. The method of claim 52 wherein at least restricting access between the first and second portions of the entry region includes at least restricting access with a restriction that depends from a ceiling portion of the entry region.

59. The method of claim 52 wherein at least restricting access between the first and second portions of the entry region includes at least restricting access with a restriction that includes a plurality of spaced apart upright members.

60. The method of claim 52 wherein the entry region includes a floor portion and a ceiling portion positioned above the floor portion, and wherein the restriction includes a plurality of spaced apart upright members with each upright member being movable between a deployed position and a stowed position, the upright members projecting upwardly from the floor portion when the upright members are in the deployed position, the upright members being at least partially retracted into the floor portion when the upright members are in the stowed position, and wherein the method further comprises moving the upright members from the stowed position to the deployed position.

61. The method of claim 52 wherein at least restricting access between the first and second portions of the entry region includes at least restricting access with a restriction that includes a generally planar, flexible sheet.

62. The method of claim 52 wherein the restriction includes a roller and a generally planar, flexible sheet wound on the roller and movable relative to the roller between a deployed position and a stowed position, the sheet being at least partially unwound from the roller to at least restrict access between the first and second portions of the entry region when the sheet is in the deployed position, the sheet being at least partially wound on the roller to allow access between the first and second portions of the entry region when the sheet is in the stowed position, and wherein the method further comprises moving the sheet to the deployed position by unwinding the sheet.

63. The method of claim 52 wherein the entry region has a floor portion and wherein the restriction includes first and second upright members pivotably coupled to the floor portion, the restriction further including a handrail pivotably coupled to the first and second upright members, and wherein the restriction is pivotable between a deployed position and a stowed position, with the upright members generally upright when the restriction is in the deployed position, and with the upright members at least partially recessed in the floor portion when the restriction is in the stowed position, and wherein the method further comprises moving the restriction from the stowed position to the deployed position by pivoting the upright members.

64. The method of claim 52 wherein the restriction has an extension that is movable between an extended position and a retracted position, with the extension projecting through the doorway when in the extended position, and wherein the method further comprises moving the extension portion to the extended position.

65. The method of claim 52 wherein the restriction has a reel and a flexible, coilable, elongated barrier extendibly coiled on the reel, and wherein the method further includes uncoiling the elongated barrier.

66. An aircraft, comprising:

a fuselage having a passenger doorway, a floor portion, and a ceiling portion;

a passenger door positioned in the passenger doorway and movable between an open position and a sealably closed position;

an entry region positioned within the fuselage adjacent to the passenger doorway, the entry region having a width configured to accommodate at least two people walking abreast;

a plurality of seats positioned within the fuselage and arranged along a first aisle having a first aisle axis and a second aisle having a second aisle axis, the second aisle axis being spaced apart transversely from the first aisle axis, each aisle being accessible from the entry region; and a restriction positioned in the entry region at least proximate to the passenger doorway and depending from the ceiling portion, the restriction dividing the entry region into a first portion accessible to the first aisle and a second portion accessible to the second aisle, the restriction at least restricting movement of people between the first portion and the second portion.

67. An aircraft, comprising:

a fuselage having a passenger doorway, a floor portion, and a ceiling portion positioned above the floor portion;

a passenger door positioned in the passenger doorway and movable between an open position and a sealably closed position;

an entry region positioned within the fuselage adjacent to the passenger doorway, the entry region having a width configured to accommodate at least two people walking abreast;

a plurality of seats positioned within the fuselage and arranged along a first aisle having a first aisle axis and a second aisle having a second aisle axis, the second aisle axis being spaced apart transversely from the first aisle axis, each aisle being accessible from the entry region; and a restriction positioned in the entry region at least proximate to the passenger doorway, wherein the restriction includes a plurality of spaced apart upright members with each upright member being movable between a deployed position and a stowed position, the upright members projecting upwardly from the floor portion when in the deployed position, the restriction dividing the entry region into a first portion accessible to the first aisle and a second portion accessible to the second aisle, the restriction at least restricting movement of people between the first portion and the second portion, the upright members being at least partially retracted into the floor portion when in the stowed position.

68. An aircraft, comprising:

a fuselage having a passenger doorway;

a passenger door positioned in the passenger doorway and movable between an open position and a sealably closed position;

an entry region positioned within the fuselage adjacent to the passenger doorway, the entry region having a width configured to accommodate at least two people walking abreast;

a plurality of seats positioned within the fuselage and arranged along a first aisle having a first aisle axis and a second aisle having a second aisle axis, the second aisle axis being spaced apart transversely from the first aisle axis, each aisle being accessible from the entry region; and a restriction positioned in the entry region at least proximate to the passenger doorway, wherein the restriction includes a generally planar, flexible sheet, the restriction dividing the entry region into a first portion accessible to the first aisle and a second portion accessible to the second aisle, the restriction at least restricting movement of people between the first portion and the second portion.

69. The aircraft of claim 68 wherein the restriction includes a roller and the generally planar, flexible sheet is wound on the roller and movable relative to the roller between a deployed position and a stowed position, the sheet being at least partially unwound from the roller to at least restrict access between the first and second portions of the entry region when the sheet is in the deployed position, the sheet being at least partially wound on the roller to allow access between the first and second portions of the entry region when the sheet is in the stowed position.

* * * * *

UNITED STATES PATENT AND TRADEMARK OFFICE
CERTIFICATE OF CORRECTION

PATENT NO. : 6,766,986 B2
DATED : July 27, 2004
INVENTOR(S) : Kazuhide Konya It is certified that error appears in the above-identified patent and that said Letters Patent is hereby corrected as shown below:

Column 1,
Line 46, "apparatus" should be -- aircraft --;

Signed and Sealed this

Twenty-first Day of December, 2004

JON W. DUDAS
*Director of the United States Patent and Trademark Office*